United States Patent
Owesson et al.

(10) Patent No.: US 6,386,487 B1
(45) Date of Patent: May 14, 2002

(54) STRETCHING DEVICE FOR ELECTRIC CABLES

(75) Inventors: Hakan Owesson, Spanga; Kauko Halonen, Vallingby, both of (SE)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/689,173

(22) Filed: Oct. 12, 2000

(30) Foreign Application Priority Data

Nov. 15, 1999 (SE) .............................. 9904107

(51) Int. Cl.⁷ .............................. F16L 3/00; E21B 19/00
(52) U.S. Cl. ........................ 248/58; 248/613; 248/624; 248/669; 166/377
(58) Field of Search ............................ 166/68.5, 377, 166/378; 248/610, 613, 637, 638, 669, 49, 58, 63, 328, 330.1, 565, 566, 624, 625; 174/45 TD, 40 TD

(56) References Cited

U.S. PATENT DOCUMENTS

| | | | |
|---|---|---|---|
| 400,757 A | * 4/1889 | Kintz | 248/330.1 |
| 1,281,128 A | * 10/1918 | Borer | 248/610 |
| 2,708,686 A | * 5/1955 | Bernard, Jr. et al. | 174/41 |
| 3,065,792 A | * 11/1962 | Andrew | 166/46 |
| 4,154,302 A | * 5/1979 | Cugini | 166/315 |
| 4,422,508 A | * 12/1983 | Rutledge, Jr. et al. | 166/376 |
| 4,478,765 A | * 10/1984 | Tubbs | 261/76 |
| 4,880,197 A | * 11/1989 | Wsyzynski | 248/324 |
| 5,109,921 A | * 5/1992 | Aracena | 166/65.1 |
| 5,762,135 A | * 6/1998 | Moore | 166/65.1 |

* cited by examiner

*Primary Examiner*—Anita King
*Assistant Examiner*—Jonathan A. Szumy
(74) *Attorney, Agent, or Firm*—Menotti J. Lombardi

(57) ABSTRACT

A stretching and connection device for electric cables leading to a submersible electric machine such as a pump or a turbine operating in a tank or shaft (1) and which is surrounded by flowing water during operation, the device including a metal wire (8) for keeping the cables (6), (7) into a package, extending between the electric machine (3) and a beam (11) at the upper part of the tank or the shaft (1). The upper connection of [said] the wire and cables are provided with adjustment screws (12), (13) by which predetermined connection forces may be given the wire and the cables, thus preventing them from, swinging in the flowing water.

5 Claims, 3 Drawing Sheets

STRETCHING DEVICE FOR ELECTRIC CABLES

The invention concerns a device for stretching and attaching one or several electric cables for feeding and/or monitoring of submersible electric machines, such as pumps, turbines and mixers.

When pumping liquids such as waste water and raw water, the so-called submersible pump has certain qualities that makes it useful, for instance when it comes to service. A submersible pump, which comprises a pump unit and an electric motor unit built together, is meant to be lowered entirely into the pumped medium within a shaft or a tank. The design is very compact and the submersible pump is now dominating within the fields mentioned.

The pump is normally arranged to be lowered along some sort of guide means, which brings the pump to and from its operation position. A pumping device of this type is shown in SE-A449 896.

The current for the electric motor is fed through one or several cables, which must hang loose or being able to be disconnected easily from the shaft wall, in order to make it possible to hoist the pump along the guide, without disconnecting the cables from the pump.

When the cables are hanging in a shaft, certain problems may occur. The water flow from the pump is often very turbulent and especially when the shafts are deep, the cables may swing or oscillate and become damaged by hits against the shaft walls or by mutual wear. This problem is solved by help of the invention as stated in the claims.

The invention is described more closely below with reference to the enclosed drawings.

Figure 1:
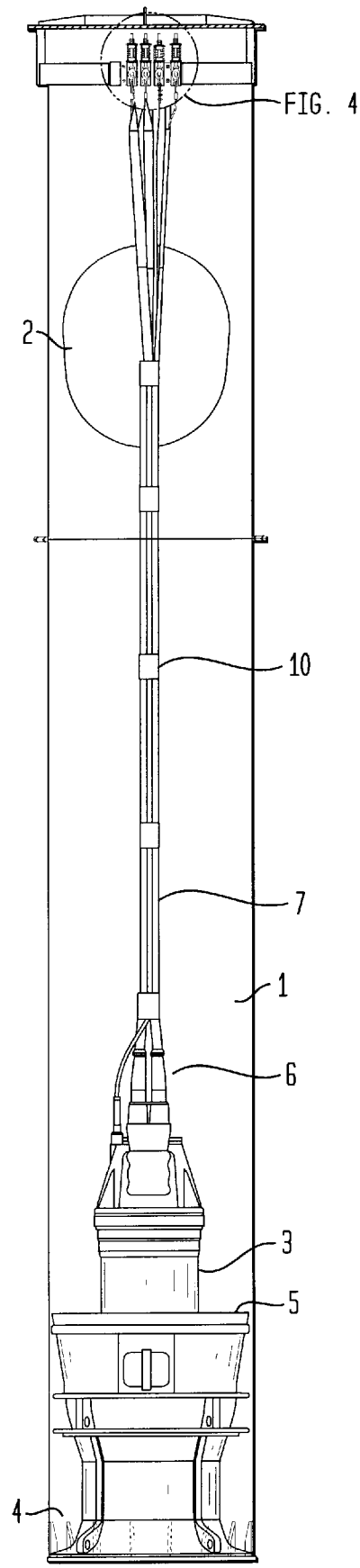
Figures 2, 3:
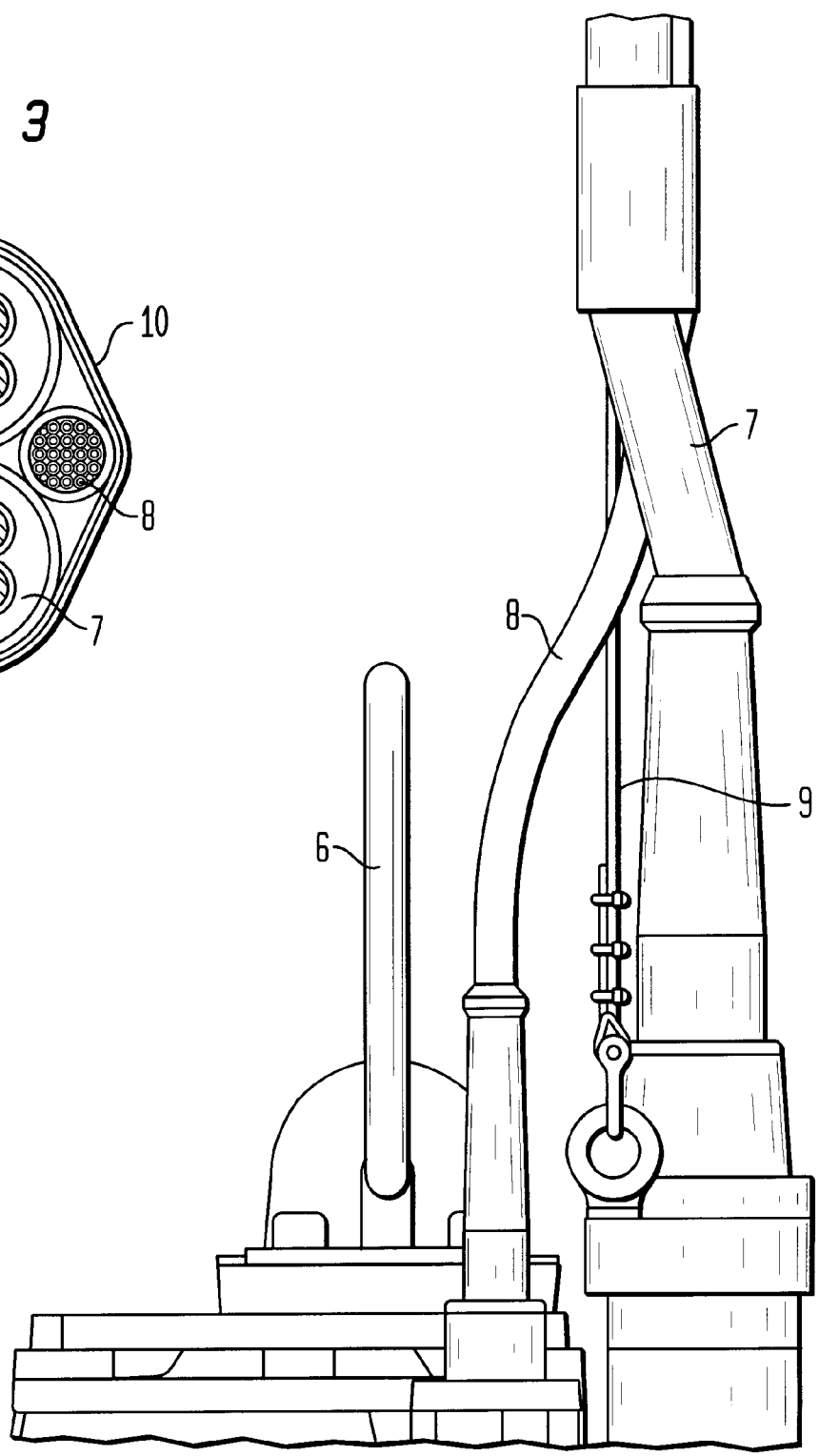
Figure 4:
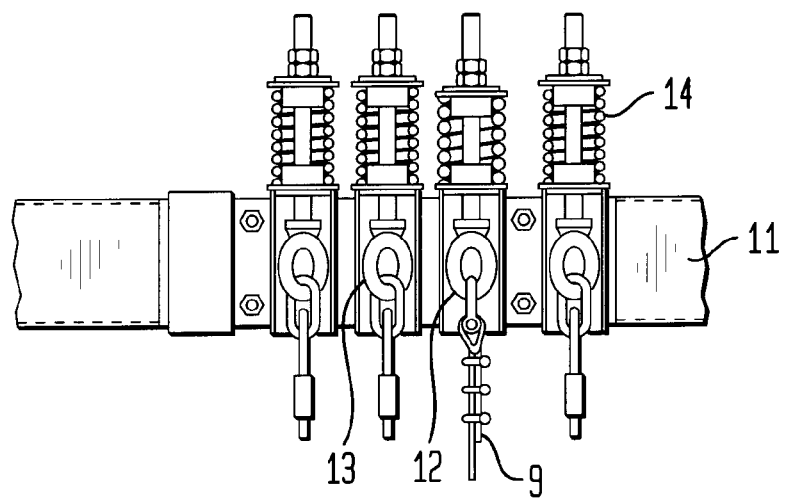
Figure 5:
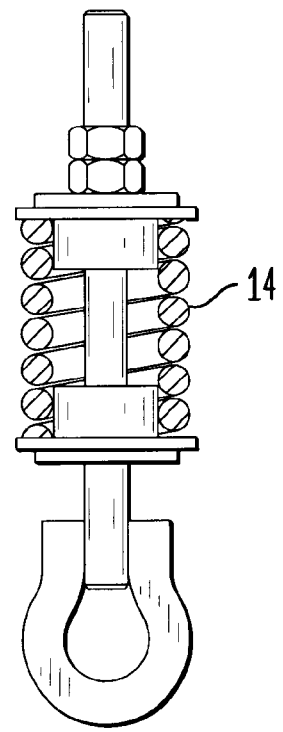

FIG. 1 shows a cut through a pump shaft according to the invention, FIG. 2 an enlarged view of the cable connection to the pump, FIG. 3 a cut through a cable package, FIG. 4 a rail for cable hanging and FIG. 5 an enlarged view over a cable stretching device.

In the drawings 1 stands for a pump shaft with an outlet 2. 3 stands for a submersible pump with inlet 4, outlet 5 and a lifting device 6. 7 stands for cables for electric supply of the pump motor and 8 a current cable for the electronic monitoring of the pump. 9 stands for a metal wire, 10 a cable holder and 11 a beam with adjusting screws 12 and 13.

In FIG. 1 the pump is shown in its operating position in the lower part of the shaft. Liquid is sucked in through the inlet 4, leaves the pump through the outlet 5 and finally leaves the shaft through the outlet 2. The electric motor of the pump is supplied through the cables 7, while the electric signals for monitoring of the pump are fed through the cable 8. In FIG. 3 is shown in more detail how said cables are connected to a beam 11 in the upper part of the shaft 1. This means that the flow will surround the cables causing them to oscillate as mentioned above.

The problem with oscillating cables is solved according to the invention in the following way: A metal wire 9 is connected between the upper part of the pump 3 and the beam 11. The cables 7 and 8 are clamped together with said wire to a package by help of evenly distributed cable holders 10. An adjustment screw 12, by which the wire is given a predetermined stress, carries out the connection between the wire 9 and the beam 11. According to a preferred embodiment of the invention, the adjustment screw is completed by a spring means 14, which secures that the correct stress is being kept.

The cables 7 and 8 are in a similar way connected to individual adjustment screws 13 and given a predetermined stress. Also here, the adjustment screws are preferably completed with spring means. The stress that should be applied to the cables and the wire respectively, depends on circumstances such as the lengths and the areas of the cables, the diameter of the shaft, the expected speed of the flow etc.

The cable holders 10 are so designed, that the cables 7 and 8 are allowed to slip within them. According to a preferred embodiment, the holders 10 are also allowed to move axially freely on the wire 9, which secures that the individual stresses in the wire and the cables can be obtained.

When the pump shall be hoisted up for service, the cables and the wire are disconnected from the adjustment screws in the beam 11 and the pump is taken up in the usual way by help of means that are attached to the lifting device 6.

The invention has a great advantage over known techniques in that the adjustment screws can be so designed, that after the stress forces in the cables and the wire have been set, the correct forces will be obtained automatically each time when the cables and the wire are connected.

What is claimed is:

1. A device for stretching and attaching electric supply and monitoring cables (7), (8) of an electrically driven, submersible electric machine (3) which is brought to its operating position in a lower part of a tank or a shaft (1), the device comprising:

a metal wire (9) for connecting between the machine (3) and the upper part of the tank or the shaft (1);

a plurality of cable holders (10) for keeping the wire together with the cables (7), (8) into a package, the cable holders (10) being axially slidable on the metal wire (9) and on the cables (7), (8); and attachment devices (12), (13) for arrangement at the upper part of the tank or shaft (1), the attachment devices (12), (13) for enabling the wire (9) and the cables (7), (8) to be individually and adjustably connected thereto.

2. The device according to claim 1, wherein the attachment devices include springs for ensuring that connection forces existing between the metal wire (9) as well as the cables (7), (8) and the attachment devices (12), (13) are maintained at individually adjustable predetermined values.

3. The device according to claim 1, wherein the metal wire (9) includes means for easily disconnecting it from its respective one of the attachment devices (12), (13) in order to make possible hoisting of the machine (3) from its operating position.

4. A method for stretching and attaching electric supply and monitoring cables (7), (8) of an electrically driven, submersible electric machine (3) which is brought to its operating position in a lower part of a tank or a shaft (1), the method comprising:

connecting a metal wire (9) between the machine (3) and the upper part of the tank or the shaft (1);

arranging a plurality of cable holders (10) along the cables for keeping the wire together with the cables (7), (8) into a package, the holders (10) being axially slidable on the metal wire (9) and on the cables (7), (8); and placing attachment devices (12), (13) at the upper part of the tank or shaft (1) for enabling the wire (9) and the cables (7), (8) to be individually and adjustably connected thereto.

5. The method according to claim 4, further comprising providing the attachment devices with springs for ensuring that connection forces existing between the metal wire (9) as well as the cables (7), (8) and the attachment devices (12), (13) are maintained at individually adjustable predetermined values.

* * * * *